United States Patent

[11] 3,622,743

[72] Inventor Hrand M. Muncheryan
 1735 Morningside, Orange, Calif. 92667
[21] Appl. No. 819,557
[22] Filed Apr. 28, 1969
[45] Patented Nov. 23, 1971

[54] LASER ERASER AND MICROWELDER
 14 Claims, 5 Drawing Figs.
[52] U.S. Cl. ...................................... 219/121LA,
 128/303.1, 350/6, 350/96
[51] Int. Cl. ...................................... B23k 27/00
[50] Field of Search ............................ 128/395,
 396, 397; 240/2.1 EL; 197/181; 219/121, 121 L,
 98; 351/6

[56] References Cited
UNITED STATES PATENTS

| | | | |
|---|---|---|---|
| 3,315,680 | 4/1967 | Silbertrust et al. | 351/6 |
| 3,321,607 | 5/1967 | Falcone et al. | 219/98 |
| 3,382,343 | 5/1968 | Muncheryan | 219/121 |
| 3,467,098 | 9/1969 | Ayres | 128/395 |

Primary Examiner—J. V. Truhe
Assistant Examiner—Robert E. O'Neill

ABSTRACT: A laser eraser and microwelder capable of operating with a pulsed or continuous-wave laser radiation is described. The device comprises a laser generator, a miniaturized electric power supply unit and a laser working head connected to the power supply unit through a flexible lasing fiber optics accompanied by an electric cable. The lasing fiber optics is optically coupled to said laser generator for generating and transmitting a laser radiation to the laser working head, and the cable conducts the laser triggering current to the laser generator through a triggering switch located in the laser working head. As an eraser, the device utilizes a defocused laser beam to erase an error character by vaporizing it from written matter and can be used either on a desk top or on a typewriter by attaching the power supply unit to the side of the typewriter housing. As a microwelder, the device utilizes a focused laser beam to weld miniaturized parts, components, and circuit leads. Radiation safety is achieved by providing a safety means in the laser working head which must be placed on the workpiece and manipulated before the triggering switch can be actuated to energize said laser generator.

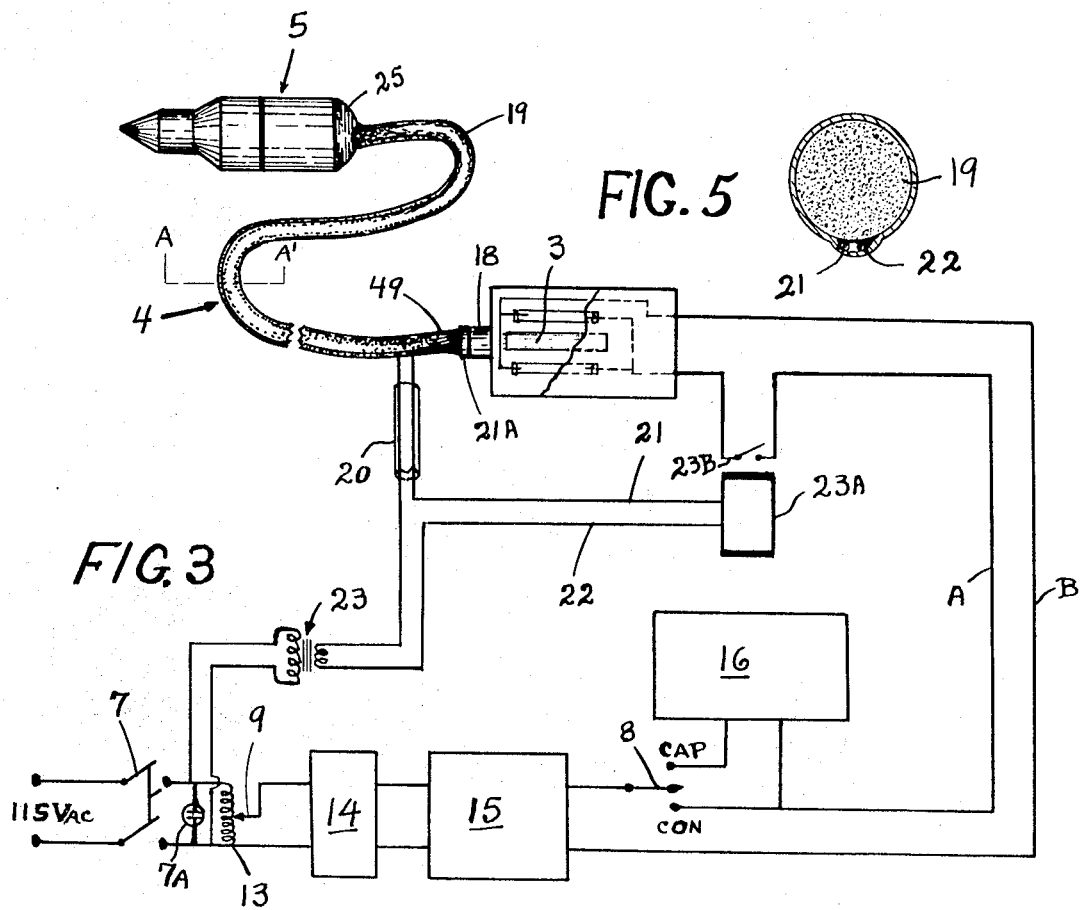
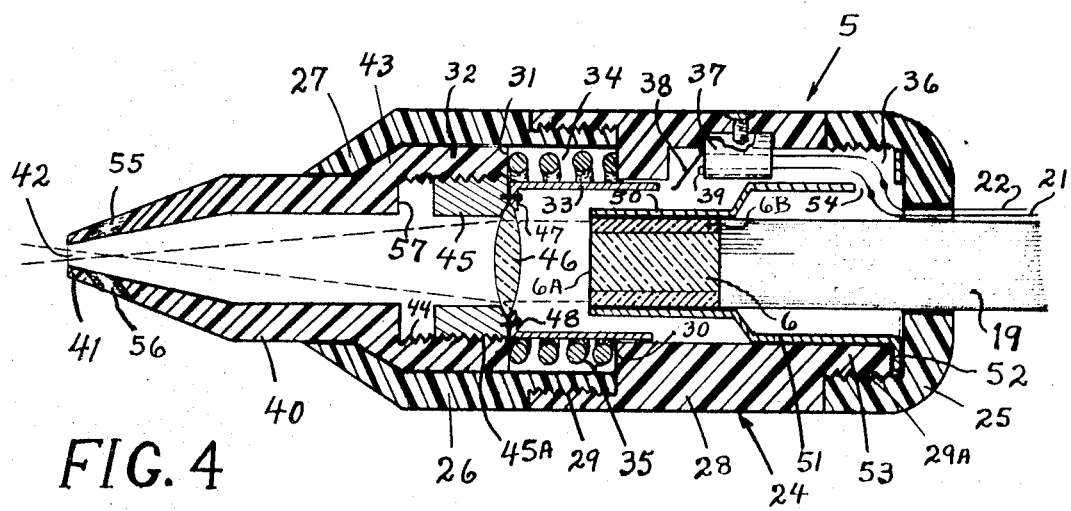

LASER ERASER AND MICROWELDER

The present invention relates to erasers and more particularly to an improved embodiment of the laser eraser described and claimed in an application filed by me in the U.S. Pat. Office on May 21, 1966, Ser. No. 536,030, now U.S. Pat. No. 3,464,534. In the U.S. Pat. No. 3,464,534, a laser eraser is disclosed in which the laser generator is located in the laser working (erasing) head of the device, whereas in the present invention, the main laser generator is remotely located in the power supply housing wherein the initial generation of laser occurs. The initial laser radiation is transmitted to the laser working head through an 18 to 20-inch long flexible lasing light pipe, which is activated by the energy of the optically coupled initial laser radiation from the main laser generator in the power supply housing. A cable running from the power supply housing along the lasing light pipe into the laser working head is connected therein to a spring loaded normally open switch. The laser working head has a telescoping terminal section having coniform end section with an opening (laser exit port) at the apex thereof. When the telescoping terminal section is placed perpedicularly over a character to be erased and pressed thereupon, the telescoping terminal section retracts into the laser working head (housing). Said spring loaded switch is so arranged in the laser working head that upon retraction of the telescoping terminal section into the laser working head housing, a portion of said terminal section mechanically couples with said switch and closes it, energizing the laser generator in the power supply housing and causing an emission of laser radiation which travels through said lasing light pipe into the laser working head and simultaneously couples with the laser emission in the lasing light pipe. The resultant radiation becomes incident on a lens disposed in said telescoping section. The lens focuses the laser beam within the housing of the laser working head; from this focus, the beam diverges and divergent beam passes through the opening at the tip of the telescoping terminal section of the laser working head to the exterior thereof to interact with any object placed in the path thereof.

The radiation beam emergent at the opening of the telescoping terminal section is "defocused" and has a diameter approximately equal to the size of a character to be erased. For microwelding, the optical lens in the laser working head is moved slightly forward toward the tip of the telescoping terminal section so that the laser beam focus occurs at the laser exit port (tip opening) and is in register with the plane of the rim of said terminal tip. In this manner, the focus of the laser beam is used for welding and the defocused beam is used for erasing an error character or a line, since the required beam intensity of the defocused laser beam is less than that at the beam focus.

The principal advantages of the present laser eraser is that the device can be utilized as a eraser to erase characters and lines and as a microwelder to weld numerous types of microelectronic devices. It is flexible in operation and can reach any drawn lines on a drawing board or any character on a typewriter, whether such a character to be erased is on the front (original) paper or on the carbon duplicate or triplicate copy of the matter being typed. The laser triggering switch is so arranged in the laser working head that it would be impossible for a laser beam to be generated and projected from the laser working head until the terminal section of the laser working head is placed perpendicularly on the character or line to be erased, or a part to be welded, and pressed thereupon so that the terminal section telescopes into the laser working head housing and makes a contact with the triggering switch that closes the circuit to the laser generator. This feature of the device then forms a safety measure to prevent the operating personnel from accidental exposure to the laser radiation. A further advantage of the present invention is that the laser beam emergent from the exit port of the laser working head is prefocused within the laser working head, so that no focusing of the laser beam with a device or microscope external to the working head would be necessary.

With the above-stated advantages in view, an object of the invention is to provide a high-intensity, lightweight, small, and compact laser eraser and microwelder that is easily portable like a conventional electric eraser from place to place; when used as a laser eraser, the device can be utilized as discrete eraser or can be mounted on a typewriter and operated thereon either manually or by one of the typewriter keys when said eraser head is mounted thereupon.

A further object of the invention is the provision of a power supply unit which can furnish a pulsed or a continuous high-voltage direct current to the laser generator.

A still further object of the invention is to provide a pulsed or continuous-wave laser generator, whereby a gas, liquid, or solid state laser-generating source can be used in the device.

Another object of the invention is to provide an operation mode selector means in the power supply unit for switching the rectified current either to the pulse-forming channel or to the continuous direct current channel of the circuit, for respectively generating either a pulsed-laser or a continuous-wave-laser radiation.

A further object of the invention is to locate the main laser-generating source in the housing of the power supply unit, and to optically couple the generated radiation through a flexible lasing light pipe (fiber optics) to form a laser resonating cavity and to convey the resultant laser radiation into the housing of the laser working head to be utilized thereby.

A still further object of the invention is to provide an optical lens in the laser working head for receiving the laser radiation from the lasing light pipe and converging the radiation to a small-diameter beam to increase the radiation intensity prior to the utilization thereof.

Another object of the invention is to bring the laser radiation into focus by means of said lens prior to incidence of said laser beam on the object area with which the laser radiation is to be interacted.

A still further object of the invention is to provide a means in the laser working head to alter the location of the focus of the laser beam projecting from said optical lens in said working head in order to use the device as a laser eraser or as a microwelder.

Other objects and advantages of the invention will become more apparent by a reference to the specification taken in conjunction with the accompanying drawings wherein like numerals refer to like parts throughout the several views of the invention, and wherein:

FIG. 3 shows a simplified block diagram of the laser eraser and microwelder device, illustrating the various functional sections of the device.

FIG. 4 is the axial sectional view of the laser working head, showing the structural details therein, and FIG. 5 is a cross-sectional view of the flexible lasing light pipe taken at A-A'.

Figure 1:
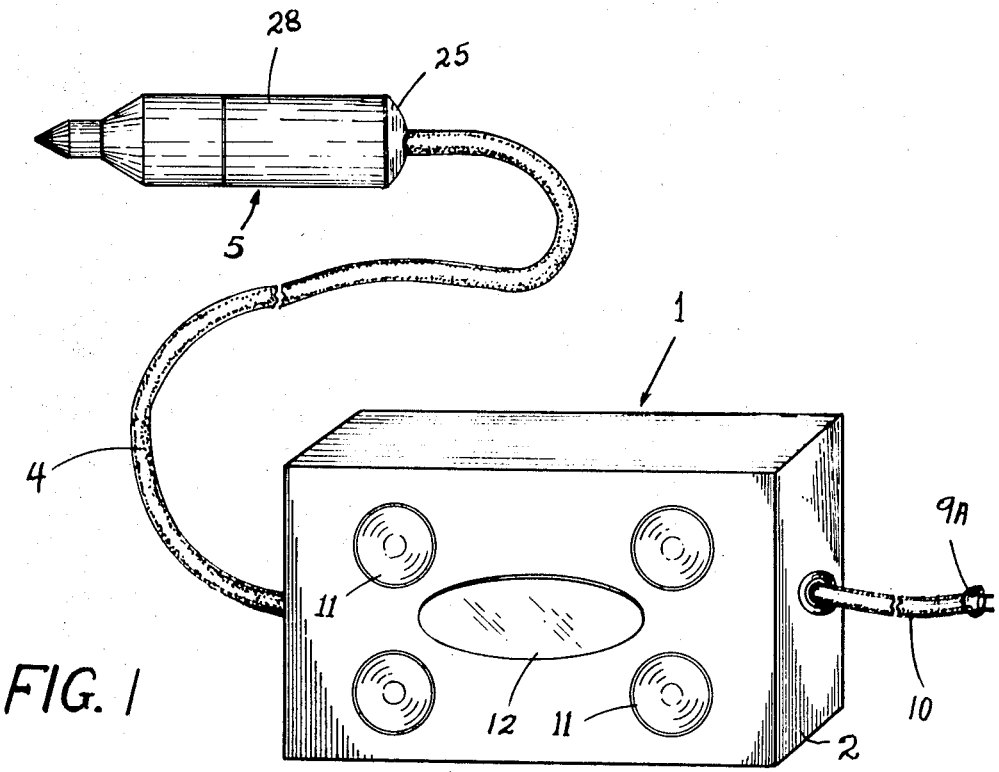
FIG. 1 is the perspective view of the invention, showing the power supply unit with its control panel, the laser working head, and the flexible lasing light pipe connected therebetween.
Figure 2:
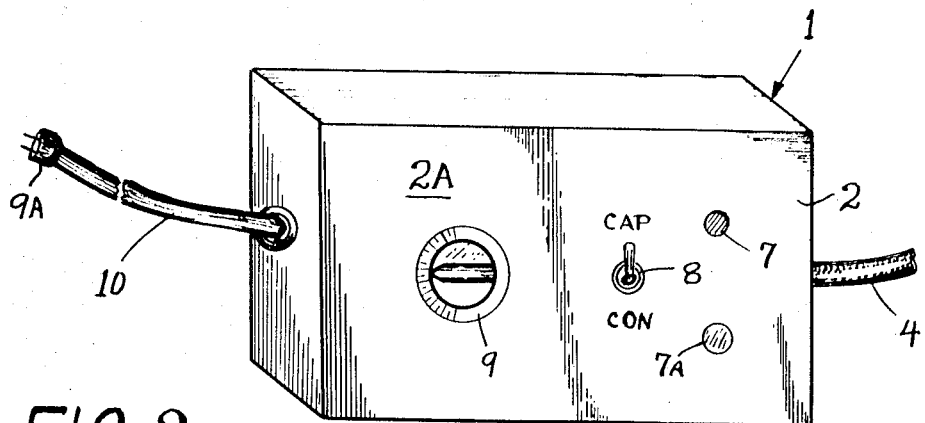
FIG. 2 shows the view of the side opposite the control panel of the power supply unit, displaying the rubber suction cups and a centrally located oval magnetic disk used for attachment of the power supply unit to a desk top or to the side of a typewriter housing, depending on the application.

Referring to the drawing, the invention comprises a power supply unit 1 containing in the housing 2 thereof a main laser generator 3, and an auxiliary laser generator formed of a flexible lasing light pipe 4, which is a radiant fiber conduit and extends from the main laser generator 3 to a laser erasing or microwelding head 5 referred to hereinafter and in previous discussions as "laser working head." The main laser generator 3 comprises a conventional laser source with an optical pumping means, the laser source being one of the solid-state, gas, or liquid lasing materials and the optical pumping means being an intense light source energized by a continuous or pulsed current from the power supply unit 1.

The auxiliary laser generator 4 comprises a bundle of radiant fibers, similar to fiber optics, made of neodymium-doped glass fibers. The auxiliary laser generator 4 is also an effective light or laser-radiation conduit, with lasing characteristics similar to ruby. At the terminal end of the radiant fiber conduit 4 is a short ruby rod or a similar lasing element 6 intimately secured to the end surface of the radiant conduit 4. The ruby rod 6, the radiant fiber conduit 4, and the main laser generator 3 in the power supply housing 2 form a laser resonating cavity, wherein the laser radiation is generated. The laser rod 6 is half-mirrored on its exposed cross-sectional surface 6A and is provided at the periphery thereof with a transparent sapphire collar 6B, which gathers the peripheral laser radiation transmitted through the radiant fiber conduit 4 and reflects the radiation peripherally along the entire length of the laser rod 6, which also receives for resonance a direct laser radiation from the main generator 3 through the radiant fiber conduit 4. In this manner, while the laser radiation is initiated in the main laser generator 3 the generation proceeds and is sustained within the entire length of the radiant fiber conduit 4 and the ruby rod 6.

One of the sidewalls of the power supply housing 2 is used as an instrument panel 2A, which contains a pushbutton main switch 7 with an indicating lamp 7A that lights up when the switch 7 is turned on. A selector switch 8 channels the laser-energizing current either to a pulsating mode section 16 when the selector switch 8 is placed at position CAP, or to a continuous mode operation when the selector switch 8 is moved to position CON, both positions having been marked on the panel 2A as shown in FIG. 1 and on the block diagram given in FIG. 3. The plug 9A connects the power supply unit 1 through the cable 10 to an external power source of 115 or 230 volts AC. The sidewall opposite the panel 2A of the housing 2 contains on its surface and attached thereon a plurality of rubber suction cups and a magnetic disk 12 of oval configuration. The magnetic disk 12 attaches the housing 2 to any magnetic surface such as a steel desk top of a steel typewriter housing; when the surface to which the housing 2 is to be attached is made of a nonmagnetic material, such as aluminum, magnesium, copper, plastic, glass, or wood, the suction cups 11 are utilized for the attachment, although both the suction cups 11 and the magnetic disk 12 simultaneously function in the attachment of the housing 2 to a magnetic surface.

Inside the power supply housing 2 are located, in the order given, a potentiometer or autotransformer 13 whose control knob 9 is located on the instrument panel 2A, a step-up transformer 14, a current rectifying channel 15, a pulse-forming network channel comprising a capacitor bank 16, and a laser generator channel 17, diagrammatically shown in FIG. 3. The voltage to be applied to the transformer 14 is selected by means of the control knob 9 of the potentiometer 13. The transformer 13 steps up the voltage to a level sufficient to energize the laser generator in channel 17 and applies the voltage to a bridge type rectifying channel 15, which converts the alternating current from the transformer 14 into a direct current. The stepped-up voltage may range from 750 to 2,000 volts or more, as necessary. The laser generating source 3 in the laser generator channel 17 together with the lasing element 19 in the flexible radiant conduit 4 may be a solid-state material, a gas, or a liquid; a solid-state lasing material is discussed herein, although a liquid lasing material will function effectively with the present design and arrangement of parts.

When it is desired to energize the laser-generating channel 17 with a pulsed voltage, the current from the rectifying channel 15 is fed to the pulse-forming capacitor bank 16, by placing the selector switch 8 to the CAP position; in such an event, the generated laser radiation is emitted in pulses, because of the charging and discharging of the pulse-forming network capacitor bank 16. A pulsed voltage mode is usually used to energize a ruby, neodymium-doped glass, or yttrium agate (YAG) and with some types of injection laser diodes, such as gallium arsenide, gas laser sources such as carbon dioxide, and liquid laser materials such as chelates. For continuous mode of laser emission, the selector switch 8 is moved to CON position, which action disconnects the capacitor bank 16 from the circuit. The generated laser radiation is projected from the laser generator channel 17 through an outlet 18 and transmitted through the flexible radiant conduit 4, containing the neodymium-doped glass fiber bundle 19, to the laser working head 5.

The flexible conduit means 4 having an external sheathing 19A also contains an electric cable 20, partially shown in FIG. 3. The cable 20 embodies the conductors 21 and 22, one end of each conductor being connected to a stepdown transformer 23 through a relay 23A, and the other ends terminate in a laser triggering switch 37 (FIG. 4) located in the laser working head 5. The voltage in the conductors 21 and 22 is stepped down to 6 to 10 volts, for safety of the operating personnel, while the conductors A and B carry the full output voltage from the step-up transformer 15, whose voltage is controlled by the potentiometer or autotransformer 13.

As will be noted from the circuit diagram shown in FIG. 3 and in the sectional view of the laser working head 5, when the switch 37 is closed the conductors 21 and 22 energize the relay 23A with a low-voltage current from the transformer 23; this action closes the high-voltage switch 23B, applying the transformer 15 voltage to the laser generating channel 17. The conductors A and B will carry either a pulsed current with the selector switch 8 at position CAP or a continuous current when the selector switch 8 is at position CON.

The laser working head 5 has a multiple-section housing 24 made of metal or preferably of a plastic material. The housing 24 comprises three parts: a cap member 25 at one end, a tubular section 26 with a bevelled or coniform portion 27 at the opposite end, and a cylindrical middle part 28, which is formed of a thick wall for reasons to be apparent presently; the three sections 25, 26, and 28 are joined together by threaded connecting means 29 and 29A. An internal shoulder 30 is formed adjacent the threaded attachment 29 of middle part 28; the shoulder 30, the upper rim 31 of the base section 32, the threaded end of tubular section 26, and the wall of the cylindrical extension or ferrule 33 form an annular chamber 34, wherein a spring 35 is located. The spring 35 exerts a compressive force against the shoulder 30 and the upper rim 31 of the base section 32 to hold them apart, as will be apparent from FIG. 4.

On one side of the cylindrical middle part 28, and internally thereto, is a groove 36 extending axially thereto, and wherein is a push-to-close-type switch 37 connected to the terminals of the conductors 21 and 22. The conductor 22 terminates at a metal spring contact strip 38 and the conductor 21 terminates at a metal contact stud 39. The spring contact strip 38 and the contact stud 39 form the switch 37 contact points.

Extending terminally from the base section 32 is a coniform section 40, which is under the compressive force at all times of the spring 35 and thus can telescope into and out of the tubular section 26 during erasing or microwelding operations. The coniform section 40 tapers to a small-diameter tip or apex 41 having an aperture or laser exit port 42 located centrally thereof. The base section 32 is cylindrical with a bevelled part 43 which fits into the coniform end 27 of section 26 and is held thereby from moving out of the laser working head 2. The cylindrical section of the base portion 32 is threaded internally as at 44 and an annular lens holder 45 with mating screw threads 45A on its external surface attaches to the cylindrical portion of the base section 32 and is rotatively movable therein. The annular lens holder 45 is provided with an optical lens 46 held thereon by means of the flange 47 of the ferrule 33 attached to the annular lens holder 45 by means of screws 48.

When the coniform section 40 is moved inward during erasing or microwelding operation, to be explained presently, the contacting means or ferrule 33 also moves and closes the switch 37 by depressing the strip 38 to make a contact with the stud 39. As the coniform section 40 is released, the compressive force of the spring 35 moves the coniform section 40 to its original, normal position, which action also moves the coniform section 40 is released, the compressive force of the spring 35 moves away from the spring strip contact 38, which then springs back and opens the switch.

The flexible conduit means 4, comprising the neodymium-doped glass 19 and the conductors 21 and 22, terminates at one end 49 having a metal ferrule 21A which fits into the outlet 18 of the laser generator channel 17; at the opposite end, the radiant conduit 19 terminates in a cylindrical metal ferrule 50, which is fitted or swaged tightly at the periphery of the fibers of the flexible radiant conduit 19 and is permanently secured thereto. The metal ferrule 50 is flared cylindrically as at 51 for nearly one-half of its length and terminates in an outwardly projecting flange 52. The flared portion 51 snugly fits into the cylindrical cavity of the tubular middle part 28 and is held tightly therein by means of the flange 52 sandwiched between the end portion 53 of the tubular middle part 28 and the cap 25 fastened thereon by the threaded connecting means 29A. An aperture 54 is provided in a portion of the flange 52 for the passage of the conductors 21 and 22 into the groove 36 provided in the cylindrical middle part 28. The flexible radiant conduit means 19 and the conductors 21 and 22 are sheathed (shown cross-sectionally as 19A in FIG. 5) along the entire length of the conduit means 4 from the power supply unit 1 to the flange 52, in a thermally shrinking plastic tubing for protection of said radiant conduit and the conductors therewith. The sheathing is not shown in the drawing of FIG. 4 for the sake of clarity of displaying the physical relationship of the conductors 21 and 22 to the radiant conduit 19.

For operating the device as a laser eraser, the power supply unit 1 is attached by rubber cups 11 (and/or magnetic disk 12) to the surface of a desk top or to the wall of a typewriter housing, and the plug 9A is inserted into a 115-volt electric outlet socket. For adjusting the optical lens 46 to a erasing mode of operation, the tubular section 26 of the laser working head 5 is detached from the middle section 28 by unscrewing the two sections at the threaded attachment 29. The ferrule 33 then is rotated so that the lens 46 with its holder 45 moves to the same plane as the upper rim 31 of the base section 32, as indicated in FIG. 4. The two sections, 26 and 28, then are assembled together by screwing section 26 into the section 28, as at 29, shown in FIG. 4.

Next, it is decided whether the device will operate on a pulsed mode or on a continuous mode operation; the pulsed mode is ordinarily used for erasing characters and the continuous mode is used for erasing lines in a drawing. For pulsed mode, the selector switch 8 is moved to position CAP (FIG. 3) to obtain a pulsed laser emission, and for continuous mode the selector switch 8 is moved to position CON to obtain a continuous laser emission. Then the main switch 7 is turned on. The device is now ready for operation. The sections 26 and 28 are held between the fingers, and the terminal tip or apex 41 of the coniform section 40 is placed perpendicularly on a character to be erased. The sections 26 and 28 are then pressed downward toward the character. This action caused the section 40 to telescope into the section 26; the ferrule 33 attached to the lens holder 45 also slides into the middle section 28 and contacts the spring strip 38, which then closes the switch 37.

The closing of the switch 37 causes the activation of the laser generator channel 17 to emission of laser radiation. The radiation passes through the annular outlet 18 and enters the lasing fiber optics conduit 19 at end 49 attached therein by means of the ferrule 21A permanently secured to the conduit end 49. The laser beam travels through the lasing conduit 19 to the other end of the conduit which terminates in the ruby rod 6A in the laser working head 5. This action causes the resonation of the laser radiation between the ruby rod 6A and the main laser generator source 3, with the lasing conduit 19 therebetween. The laser beam then is projected unto the lens 46, which focuses the incident laser beam at a point within the coniform section 40 and axially thereof, as demonstrated in FIG. 4, by the broken lines. From this point of focus, the laser beam projects divergently as it passes through the laser exit port 42 and becomes incident on the error character to erase it by vaporizing said character, which is placed at the tip 41. Thus the error character receives the divergent laser beam and not the focus of the beam, the focus being the hottest point in the laser beam. The divergent laser beam at the exit port 42 possesses sufficiently large diameter (area) to cover an elite-type character to be erased. When a large character is to be erased, the section 26 is detached from section 28 at the screw-threaded attachment 29, and the ferrule 33 is rotated slightly so that the lens holder 45 with lens 46 moves toward the end face of the ruby rod 6A. This procedure permits a sufficient increase in the laser beam diameter at the exit port 42 to the approximate size of the desired larger error character (the extent of movement of the lens 46 can be determined after a few trials). In this way, the ferrule 33 also functions as a lens adjustment means. The sections 26 and 28 are then fastened together at the threaded attachment 29. For the larger character, the laser beam intensity must be proportionately increased by rotation the control knob 9 to increase the electric power to the laser generator to compensate for the energy required. The laser beam intensity for erasing characters is generally 200 kw./cm.$^2$ at an area of 1 square millimeter, the area of a small letter. Therefore, the increase or decrease in laser beam intensity can be made on the basis of this relation. The scale of the control knob 9 is usually marked for different size characters by precalibrated computation. The radially located apertures 55 and 56 adjacent the tip 41 permit any gaseous matter from the vaporized error character to escape into the atmosphere during erasing operation.

For microwelding a workpiece, the tubular section 26 is detached from the middle section 28, and the lens holder 45 together with the lens 46 is moved by rotating the ferrule until the lens holder 45 is seated on the shoulder 57 of the coniform section 40. This action displaced the laser beam focus to a point on a plane in line with the front surface of the tip 41; i.e., the focus is moved to the exit port 42. The two sections, 26 and 28, are then assembled together by reversing the disassembly procedure. Since metallic materials require higher temperature to melt and become welded than the written (carbon) characters to vaporize, the metal workpiece receives the focus of the emergent laser beam. Since the laser beam focus is measured in mils (1 mil=1/1000 inch) in microwelding, for one mil diameter focus, the laser beam intensity will be 1,600 times greater than at one square millimeter area of a character to be erased. The metal weld size varies from 15 to 20 microns to several mils in diameter. The welding operation is similar to erasing, i.e., the tip 41 is placed perpendicularly on the workpiece and the housing 24 of the laser working head 5 is pressed on the workpiece so as to cause the section 40 to telescope into the sections 26 and 28 for closing the laser triggering switch 37. The electric energy to activate the laser generator may be increased or decreased by means of the knob 9 in accordance with the type and thickness of the metal to be welded. An instruction for energy requirement for different metals and thicknesses may be printed on the panel adjacent the knob 9 or on a separate data sheet.

I have thus provided a novel and useful method and equipment for erasing characters and lines as well as welding miniature electronic parts and components, in a manner easily manipulative and effectively accomplished. Furthermore, while I have signified the use of this equipment for erasing characters and welding parts, the apparatus can also be used in its present form for drilling holes in human teeth or repairing the enamel thereof, removing warts and tattoos from human skin, cauterizing superficial growths or infected glands under a qualified medical authority.

I claim:

1. A laser system capable of operating as an eraser and as a microwelder, said system comprising a laser generator having dual-mode-operative power-supply circuit, said laser generator having an incremental lasing means projecting therefrom, and a laser working head coupled to said laser generator through said incremental lasing means thereof and receiving radiation therefrom; said incremental lasing means having a lasing element at the terminal end thereof and forming cooperatively with said element and said laser generator a continuous laser stimulating cavity therein; said laser working head having an axially displaceable coniform section with an opening at the tip thereof, an optical system disposed in said coniform section and having means for internally adjusting said optical system in axial respect to said coniform section and movable thereby, and a laser emission control means positioned in said laser working head in adjacent relation to said means for internally adjusting said optical system and activated thereby; said laser emission control means having connecting means coupled to said dual-mode-operative power-supply circuit which being provided with means to select from said circuit one of the operative modes thereof; said optical system being adapted to receive laser radiation from said lasing element form on said incremental lasing means and to direct said radiation through the opening of said coniform section, at the tip thereof, upon a workpiece placed in abutment with said tip for interaction of said radiation with said workpiece.

2. A laser system as defined in claim 1, wherein said laser working head comprises a housing having therein a mobile section with a terminal portion of coniform configuration, a lens holder having a lens adjustably disposed in said mobile section in axial respect thereof, means provided on said lens holder for adjusting the axial position thereof, the resilient means in said laser working head in abutment with said mobile section to support said section together with said lens holder in an outwardly projecting position within said laser working head.

3. The laser system as defined in claim 1, wherein said laser working head comprises a housing having therein a coniform section adapted to slide inward and outward within said housing in spaced relation to said lasing means therein; said coniform section having an axially adjustable means in the base thereof and an optical means disposed in said adjustable means, a spring means disposed in said housing in peripheral relation to said axially adjustable means and in abutment with said coniform section to control the inward and outward movement thereof and thereby the axial movement of said optical means therein with respect to said lasing means.

4. The laser system as defined in claim 1, wherein said incremental lasing means coupled to said laser working head is formed of a flexible sheathing including therein a lasing means; said sheathing means being continuous at one end with a laser generator and at the other end being provided with a solid-state element with reflecting means thereon and optically coupled to said lasing means within said flexible sheathing; said solid-state lasing element with said reflecting means thereof being positioned within said laser working head centrally thereof.

5. A laser system capable of operating as microwelder and as a eraser, said system comprising a power supply unit containing a laser generator connected thereto, a laser working head having a housing with a movable section provided with a pointed terminal end and an axial opening therein, and a flexible filamentary lasing means joining said power supply and said laser generator to said laser working head; said power supply unit comprising a circuit of dual-mode operation channels; one of said channels being provided with means to produce a direct current and the other being provided with a capacitive network to produce a pulsing current; means disposed in said power supply unit for selectively operating said channels to furnish a direct current and a pulsing current to said laser generator for respective generation thereby of a continuous-wave radiation and a pulsing radiation; said flexible filamentary lasing means being an elongated laser generator receiving lasing energy from said first-mentioned laser generator and being stimulated thereby to emission of a laser radiation; electric conductive means extending along the length of said flexible filamentary lasing means and connecting to the circuit of said means for selecting a laser operative mode; said movable section with a pointed terminal end having an optical system adjustably positioned in axial respect thereto; and, a laser triggering means connected to said electric conductive means being positioned in said laser working head in adjacent relation to said optical system and operable thereby for producing within said flexible filamentary lasting means a radiation to project upon said optical system; said optical system being adapted with means to direct said radiation to the exterior of said housing through the opening in said pointed terminal end of said movable section.

6. A laser system as defined in claim 5, wherein said power supply unit with said laser generator therein having means thereon adapted to secure said unit to a supporting surface and a control means to selectively furnish from said laser system a laser radiation beam in pulsing mode and in continuous-wave mode.

7. A laser system capable of operating as an eraser and as a microwelder, said system comprising a power supply unit with a laser generator connected thereto to receive energizing energy therefrom, a flexible lasing means extending from said laser generator and optically coupled thereto, and a laser working head having a housing with a chamber therein being connected to the free end of said flexible lasing means with said free end extending partially thereinto; said housing having a coniform end section with an apertured tip and a middle section with a shoulder means formed therein; and annular recess formed within said laser working head between the base section of said coniform end section and the shoulder means of said middle section and means disposed in said recess and adapted to normally retain said coniform end section in spaced relation to said free end of said flexible lasing means; said coniform and section having an axial chamber extending to the tip thereof, and being movable within said middle section; an optical means having an adjusting means disposed centrally in said coniform end section and movable thereby with respect to said lasing means to receive laser radiation therefrom; a laser energizing means with communicating with the circuit of said laser generator being positioned in said middle section adjacent to said adjusting means and activated thereby during operation of said laser working head; said laser radiation received by said optical means being directed thereby convergently to the exterior of said tip through the aperture thereof.

8. A laser system as defined in claim 7, wherein said flexible lasing means partially extending into said laser working head terminates in a lasing element intimately secured to the end thereof, a sapphire means attached to said lasing element to gather and reflect laser radiation unto said lasing element for activation thereof by the joint radiation from said flexible lasing means and that reflected from said sapphire; supporting means disposed in said laser working head and adapted to position said sapphire, said lasing element, and said flexible lasing means centrally within said laser working head to project a laser radiation centrally thereto.

9. The laser system as defined in claim 7, wherein said optical means in said coniform end section with an apertured tip is provided with a lens mount and a lens secured in said lens mount; said lens mount having an elongated end section projecting in axial respect to said coniform end section and being adapted to be manually adjusted for positioning the focal point of said lens on the principal axis of said coniform end section and in spaced relation to said tip.

10. A laser system capable of operating as an eraser and as a microwelder, said system comprising a laser working head having a housing accommodable in hand and operable thereby for microwelding materials and erasing characters from written documents; said housing having at one end a cylinder tapering conically to an apex having therein an aperture extending divergently into the interior of said cylinder, which being adapted to move inwardly upon a pressure exerted on said apex; the opposite end of said housing being provided with an elongated lasing means having thereon connecting means adapted to couple said lasing means to a source of laser radiation to activate said lasing means; an optical lens means with a lens therein being disposed in said cylinder and having means for adjusting the optical plane of said lens along the principal axis of said cylinder and at right angles to said axis thereof for receiving a laser radiation from said lasing means; means to effect the activation of said laser radiation being disposed in said laser working head and operable by said means for adjusting the optical plane of said lens; said means to effect the activation of laser radiation being connected to said connecting means; said lens receiving laser radiation from said lasing means directs said radiation along said axis to the exterior of said cylinder through the aperture thereof for focusing said radiation on a workpiece placed adjacent to said apex; said laser working head and said elongated lasing means with said connecting means to couple said lasing means to a source of laser radiation forming a unitary article of manufacture.

11. A laser system capable of operating as an eraser and as a microwelder, said system comprising a laser generator with a power-supply unit connected thereto for energizing said laser generator, and a laser working head having a radiation-coupling lasing means projecting therefrom and being coupled to said laser generator, forming a unitary laser generating and instrumentation system; said laser working head having a housing with a spring-loaded coniform section provided with an opening therethrough, a lens holder with a lens means therein disposed in said coniform section and having means for adjusting said lens holder in axial respect to said coniform section; a laser energizing means positioned in cooperative respect to said means for adjusting said lens holder and activated thereby; said radiation-coupling lasing means being elongated and having a laser-emission means disposed at each end thereof and optically coupled to each of said laser-emission means to form a continuous laser-stimulating cavity therewith; said lens means receives laser radiation from said laser-stimulating cavity and projects said radiation convergently to the exterior of said coniform section through the opening thereof.

12. A laser system capable of operating as a microwelder and as a eraser, said system comprising a power supply unit with a dual-mode-function laser generator therein, a laser manipulating head having therein an axially extending chamber opening to the exterior thereof, an optical means disposed in said chamber in axial relation thereto, laser-energizing means disposed adjacent to said optical means and operated thereby and a connecting means joining said power supply unit to said laser manipulating head to form a unitary article of manufacture; said connecting means being an elongated cylindrical lasing element optically coupled at one end to said laser generator and at the opposite end being connected to said laser manipulating head and extending partly thereinto; the portion of said cylindrical lasing element extending into said laser manipulating head being provided with a solid-state ruby rod having a reflecting means on the periphery thereof; said laser generator, said elongated cylindrical lasing element, and said ruby rod with said reflecting means thereon cooperatively forming a continuous medium of emission of laser radiation, which being received by said optical means and projected thereby to the exterior of said laser manipulating head through the opening thereof.

13. The laser system as defined in claim 12, wherein said optical means disposed in said chamber having an adjusting means for axially positioning said optical system in said chamber and adjusting the focus size of the laser radiation beam transmitted through said optical means and incident on a workpiece being worked upon.

14. A directed-beam laser system capable of welding miniature parts and erasing characters from documents, said system comprising a power-supply unit with means to attach said unit to a surface external thereto, a laser emitting means disposed in said power-supply unit and receiving energizing power therefrom, a laser instrumentation means, and a lasing conduit means optically coupled at one end to said laser emitting means and connected at the other end thereof to said laser instrumentation means to transmit laser radiation thereinto; an optical system disposed within said laser instrumentation means in adjacent relation to said lasing conduit means to receive laser radiation therefrom and to focus said radiation along a point tin the principal axis of said laser instrumentation means, and a control means disposed in said laser instrumentation means and connected to the circuit of said laser emitting means; said optical system being movable axially within said laser instrumentation means with respect to said control means therein for negotiating therewith and energizing thereby said laser-emitting means to generate laser radiation therein and in said lasting conduit means.

* * * * *